Nov. 27, 1923. 1,475,265

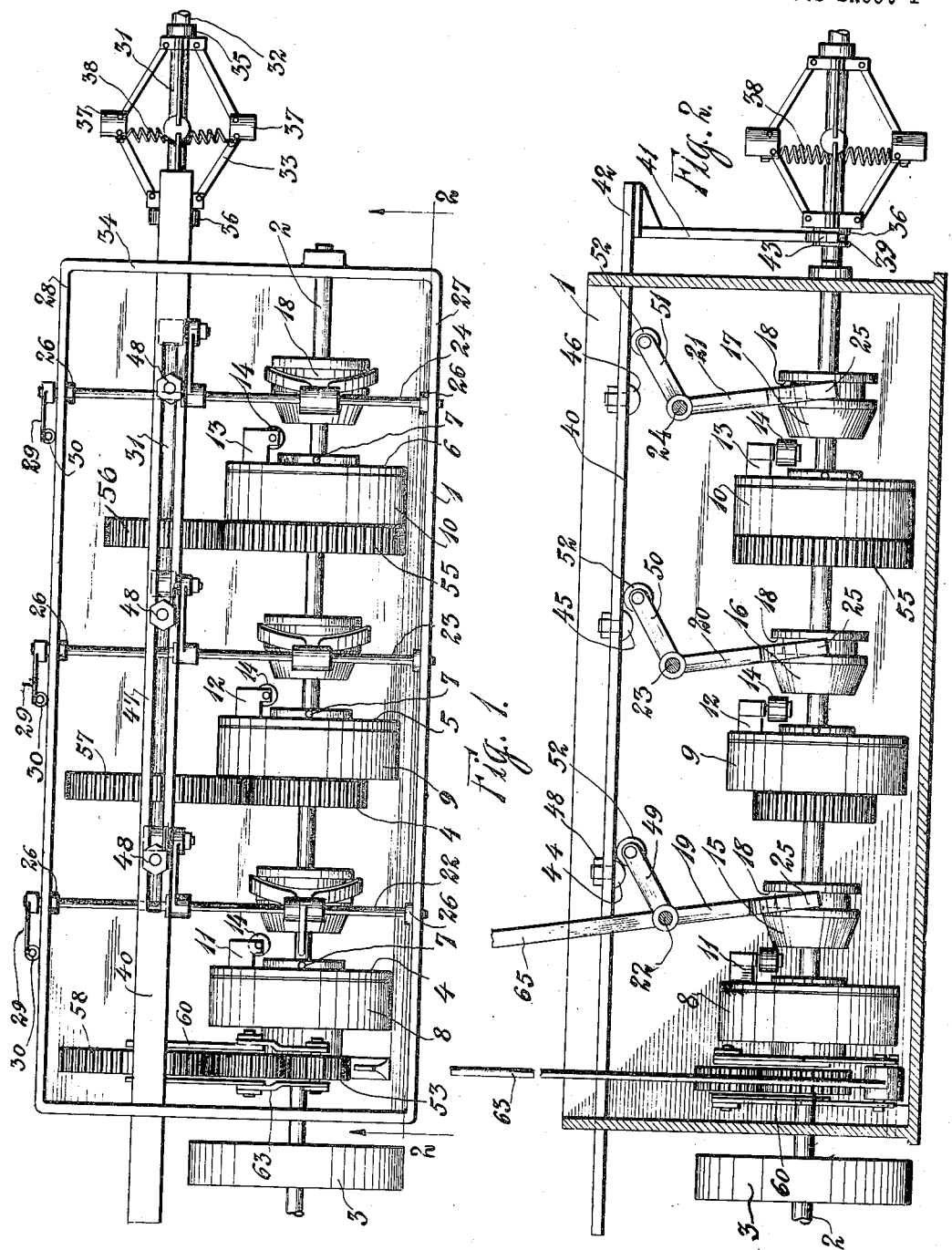

H. R. HOFFMAN

AUTOMATIC GEAR SHIFT AND SPEED CONTROL

Filed Nov. 12, 1921  2 Sheets-Sheet 2

INVENTOR
H. R. Hoffman.
BY
ATTORNEYS

Patented Nov. 27, 1923.

1,475,265

UNITED STATES PATENT OFFICE.

HENRY R. HOFFMAN, OF CHICAGO, ILLINOIS.

AUTOMATIC GEAR SHIFT AND SPEED CONTROL.

Application filed November 12, 1921. Serial No. 514,666.

*To all whom it may concern:*

Be it known that I, HENRY R. HOFFMAN, a citizen of the United States, and a resident of Chicago, in the county of Cook and State of Illinois, have invented a new and useful Improvement in Automatic Gear Shifts and Speed Controls, of which the following is a full, clear, and exact description.

My invention relates to improvements in automatic gear shifts and more particularly to the gear shift mechanism of a motor vehicle.

An object of my invention is to provide a device of the character described in which the manual shifting of the speed gears is obviated.

A further object of my invention is to provide a device of the character described in which the gear ratio intermediate the motor and the differential shaft is progressively increased as the speed of the differential shaft is increased.

A further object of my invention is to provide a device of the character described for use on a motor vehicle which will eliminate the necessity of the present clutch mechanism, the foot clutch release and the gear shift lever.

A further object of my invention is to provide a device of the character described having a series of clutches disposed intermediate the engine shaft and the differential shaft and in which the clutches are arranged to selectively engage and drive the differential shaft dependent upon the speed at which the differential shaft rotates.

Other objects and advantages will appear in the following specification, and the novel features will be particularly pointed out in the appended claims.

My invention is illustrated in the accompanying drawings, forming part of this application, in which—

Fig. 1 is a top plan view of an embodiment of my invention,

Fig. 2 is a sectional view along the line 2—2 of Fig. 1,

Figure 3:
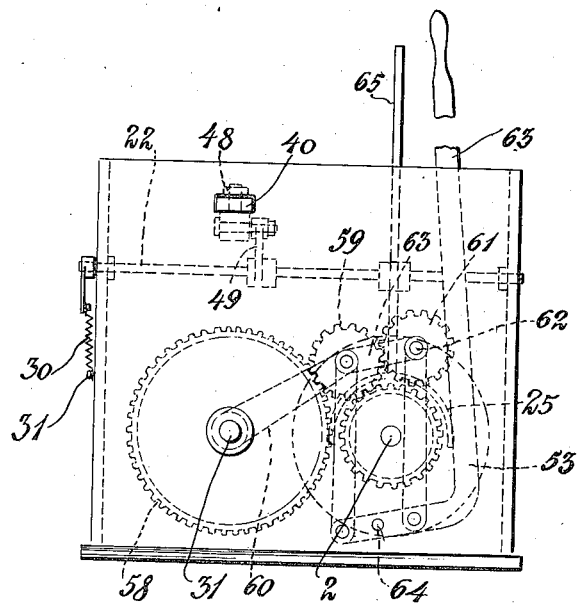
Fig. 3 is an end elevation of the mechanism illustrated in Fig. 1.
Figure 5:
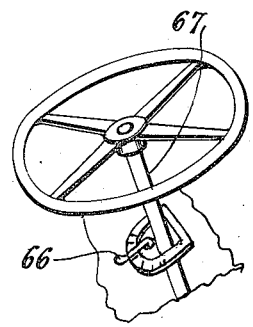
Fig. 5 is a view of the hand operated clutch lever.
Figure 4:
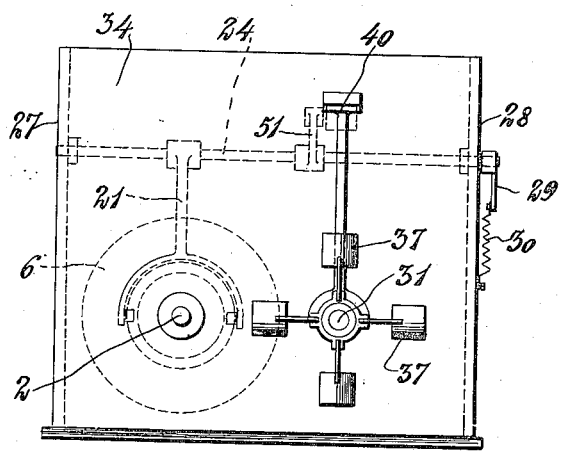
Fig. 4 is an elevation of the opposite end of the mechanism illustrated in Fig. 1.

In carrying out my invention, I make use of a rectangular metal frame 1, in which is rotatably mounted a shaft 2. The shaft 2 is directly connected to the fly wheel 3 of the engine (not shown). Clutch plates 4, 5 and 6 are carried by the shaft 2 and arranged at regular intervals thereon. The clutch plates are secured on the shaft 2 by means of set screws 7. Clutch casings 8, 9 and 10 are also rotatably mounted on the shaft 2 and are associated with the clutch plates 4, 5 and 6, respectively. The structure of these clutch plates and clutch casings is identical to friction clutches which are in common use. The plates 4, 5 and 6 each carry an arm 11, 12 and 13, respectively, which arms are arranged to turn upon their respective plates. In turning, the arms 11, 12 and 13 cause steel rings, which are associated one with each of the plates 4, 5 and 6, respectively to expand and grip the adjacent casing 8, 9 or 10, as the case may be. This will cause the respective casing to revolve with the clutch plate upon which the arm 11, 12 or 13 is turned. Each of the arms 11, 12 or 13 carry rollers 14, substantially as shown in Fig. 1. Three conical sliding cam members 15, 16 and 17 are slidably disposed on the shaft 2, one adjacent each of the clutch plates 4, 5 and 6. These conical cam members need not rotate with the shaft 2. Each of the conical cam members 15, 16 and 17 is provided with a groove 18 on the outer surface thereof and at the rearward end. Bifurcated levers 19, 20 and 21 are carried by transverse rock shafts 22, 23 and 24 so that the bifurcated portion 25 will engage the groove 18 in the conical bearing member 15, 16 and 17. The rock shafts 22, 23, and 24 are mounted in bearings 26 carried by the side walls 27 and 28 of the rectangular metal frame 1. Each of the rock shafts are provided with a short lever arm 29 at one end thereof substantially as shown in Fig. 1. These lever arms are each connected to a tension spring 30, the other end of which is secured to the side wall 28 of the frame 1. The purpose of the springs 30 and the levers 29 is to normally hold the levers 19, 20 and 21 in the position, as shown in Fig. 2, with the conical cam members 15, 16 and 17 out of engagement with the clutch arms 11, 12 and 13.

A second shaft 31 is disposed in parallel relation to the shaft 2 and is rotatably mounted on the metal frame 1. The shaft 31 is connected at one end 32 to the differential of the motor vehicle (not shown). A centrifugal governor 33 is disposed upon the shaft 31 adjacent the end 34 of the metal frame 1. The governor 33 is fixed to the shaft 31 at its end 35. The other end 36 is arranged to slide upon the shaft 31 as the weights 37 are thrown outwardly against the springs 38 as the speed of the shaft 31 increases. The end 36 of the governor 33 is provided with a groove 39.

A sliding cam shaft 40 of strap steel is slidably mounted parallel and above the shaft 31 on the frame 1. A downwardly extending arm 41 is secured to the sliding shaft 40, as shown at 42 and is provided with a bifurcated portion 43. The portion 43 of the arm 41 is arranged to engage the groove 39 so that the sliding cam shaft 40 will move longitudinally as the governor 33 is operated.

The cam shaft 40 is provided with adjustable cam members 44, 45 and 46. These cam members are disposed upon the lower surface of the shaft 40 and are arranged to move longitudinally in a groove 47 for adjustment thereof. Each of the cam members is provided with a nut 48 which, when tightened securely, fixes the cam members relative the shaft 40.

The rock shafts 22, 23 and 24 are each provided at a point above the shaft 31 with short lever arms 49, 50 and 51, respectively. These arms each carry a roller 52 rotatably mounted in parallel relation with their respective rock shafts 22, 23 and 24. The arms 49, 50 and 51 are arranged so that they normally rest with their rollers on the lower surface of the sliding cam shaft 40 and while in this position, the conical cams 15, 16 and 17 are out of engagement with the clutch arms 11, 12 and 13, respectively. When the cam members 44, 45 and 46 engage any one of the rollers 52, the conical cam member associated therewith will move and the cam 15, 16 or 17, as the case may be, will engage its adjacent clutch arm to occasion the operative connection of the clutch plate and its associate casing.

Each of the casings 8, 9 and 10 are provided with gears 53, 54 and 55. The gear 53 is the smallest and is carried by the casing 8. The gear 54 is an intermediate gear and is carried by the casing 9. The gear 55 is a relatively large or high speed gear and is carried by the casing 10. A relatively small gear 56 is disposed on the shaft 31 and is arranged in mesh with the gear 55. An intermediate gear 57 is also secured on the shaft 31 and is arranged in mesh with the gear 54. A third gear 58 is carried upon the shaft 31 and is disposed opposite the gear 53, but is not in mesh therewith but is provided with a pair of intermediate gears which are arranged to constitute a reversing mechanism which will here be described.

Referring now to Fig. 3, the gear 58 is provided with a relatively small gear 59 which is supported by bars 60 on each side of the gear 58 pivotally mounted on the shaft 31. A second small gear 61 is arranged in mesh with the gear 59 and is supported upon a shaft 62 which is carried by two short bars 63, one on each side of the gears 59 and 61, substantially as shown in the drawings. A hand lever 63 is provided and is pivotally mounted at 64 so that when the lever is moved to the right while in the position shown in Fig. 3, both gears 59 and 61 will be disposed intermediate the gears 58 and 53 to cause the shaft 31 to revolve in the same direction as the shaft 2. If the lever 63 is allowed to stand in the position shown in Fig. 3, then merely the gear 59 is disposed intermediate the gears 58 and 53 and the shaft 31 is rotated in the reverse direction from the shaft 2.

From the foregoing description of the various parts of the device, the operation thereof may be readily understood. Assuming that the gear shifting mechanism is placed in the ordinary type of motor vehicle, the shaft 2 should be operatively connected to the fly wheel 3 of the engine. The shaft 31 is connected directly to the differential of the vehicle. If the engine of the vehicle is now started and the foot pressed on the accelerator, the shaft 2 will merely revolve carrying with it the three clutch plates 4, 5 and 6. The casings 8, 9 and 10 carrying their respective gears will remain stationary. It is therefore necessary to manually engage one of the three clutch members and for this purpose an extension 65 is provided on the lever 19. The extension 65 is connected to a short lever 66 adjacent the steering post 67 of the car. The driver, in starting the car, will now operate the lever 66 to cause the conical cam member 15 to engage and turn the arm 11 on the revolving face 4 of the first or low speed clutch. As the arm 11 is turned, the casing 8 will become engaged with the clutch plate 4 and revolve therewith. When the casing 8 revolves, it carries with it the gear 53 which will in turn drive the gear 58 on the shaft 31, causing the shaft 31 to turn. The shaft 31, in turning, will drive the car and as the speed thereof increases, the weights 37 of the cover 33 will be thrown outwardly and the end 36 will move toward the end 35 of the governor. This will cause the arm 41 to be moved and move with it the sliding cam shaft 40. As the cam shaft 40 moves toward the end 34 of the frame 1, the cam member 44 will engage the roller 52 of the arm 49 and will serve to hold the lever 19 and the conical cam 15 in a position as manually moved by the extension lever 65. As more gas is fed to the engine, the governor 33 will further spread and cause the cam member 45 to engage the roller 52 of the lever 50 which will then cause the conical cam 16 to slide into engagement with the arm 12, and the clutch plate 5 will thereupon drive the casing 9 carrying the gear 54. Simultaneous to this action the cam member 44 will be released from the roller 52 of the arm 49 and will thereupon release the conical cam 15 from the arm 11 of the clutch plate 4. The car will now be driven in second speed, since the intermediate gear 54 is being driven by the shaft 2 and in turn is driving the gear 59 on the shaft 31.

As more gas is fed to the motor, the governor 33 will further spread, causing the cam member 46 to engage the roller 52 of the lever arm 51 to occasion the engagement of the conical cam 17 with the arm 13 of the clutch plate 6. Simultaneous to this movement, the cam member 45 will have passed over the roller 52 and disengage the roller to occasion the releasing of the conical cam 16 from the arm 12. The car is now being driven in third or high speed and the gear 55 is driving the gear 56.

If now the accelerator is released, the clutches will be progressively operated in precisely the reverse manner in which they were operated in increasing the rear ratio intermediate the shaft 2 and the shaft 31, as described.

It should be noted that while in this case the governor 33 is shown disposed on the shaft 31, that the governor 33 may be disposed on an auxiliary shaft and operatively connected with the shaft 31 in various ways.

I claim:

1. A device of the character described comprising a shaft adapted to be driven by the engine of a motor vehicle, a second shaft rotatably mounted in parallel relation to said first named shaft and adapted to be connected to the differential shaft of said motor vehicle, a plurality of clutches associated with said first named shaft, gears diposed on said second named shaft, one for each of said clutches and operatively connected thereto, a sliding cam shaft in parallel relation with said second named shaft, said cam shaft being provided with a slot extending longitudinally thereof, a plurality of cam members, one for each of said clutches engaged with the slot in said sliding shaft and arranged for longitudinal adjustment on said shaft, said cams being arranged to operate said clutches as said cam shaft is actuated, and means for moving said cam shaft as the speed of said second named shaft is varied.

2. In a device of the character described, a plurality of clutches, a bell crank for operating said clutches, one for each clutch, a sliding cam shaft, said cam shaft having a slot therethrough extending longitudinally thereof, a plurality of cam members, one for each of said clutches engaged by the slot of said cam shaft and arranged for adjustment longitudinally on said shaft, said cams being arranged to engage with said bell cranks progressively to actuate said clutches progressively as said cam shaft is moved.

HENRY R. HOFFMAN.